United States Patent
Sultenfuss et al.

(10) Patent No.: US 8,898,489 B2
(45) Date of Patent: Nov. 25, 2014

(54) INFORMATION HANDLING SYSTEM WIRELESS POWER DOCKING STATION MODULE WITH SHARED POWER SOURCE AND WIRELESS PERIPHERAL SUPPORT

(75) Inventors: Andrew T. Sultenfuss, Leander, TX (US); Kevin Mundt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 487 days.

(21) Appl. No.: 13/189,791

(22) Filed: Jul. 25, 2011

(65) Prior Publication Data

US 2013/0031377 A1   Jan. 31, 2013

(51) Int. Cl.
- G06F 1/00 (2006.01)
- H01F 27/42 (2006.01)
- H02J 5/00 (2006.01)
- G06F 1/16 (2006.01)
- H02J 7/02 (2006.01)

(52) U.S. Cl.
CPC ............... *H02J 5/005* (2013.01); *H02J 7/025* (2013.01); *G06F 1/1632* (2013.01)
USPC ........................... 713/300; 713/340; 307/104

(58) Field of Classification Search
USPC .............. 713/300, 340; 307/104; 361/679.02; 710/303; 320/108; 348/222.1
See application file for complete search history.

(56) References Cited

U.S. PATENT DOCUMENTS

| | | | | |
|---|---|---|---|---|
| 7,793,121 | B2 * | 9/2010 | Lawther et al. | 713/300 |
| 8,185,755 | B2 * | 5/2012 | Yamasuge | 713/300 |
| 8,234,509 | B2 * | 7/2012 | Gioscia et al. | 713/300 |
| 8,305,741 | B2 * | 11/2012 | Chatterjee | 361/679.02 |
| 8,373,310 | B2 * | 2/2013 | Baarman et al. | 307/104 |
| 8,380,998 | B2 * | 2/2013 | Azancot et al. | 713/300 |
| 2004/0150934 | A1 * | 8/2004 | Baarman | 361/115 |
| 2005/0246470 | A1 | 11/2005 | Brenner | |
| 2008/0195788 | A1 | 8/2008 | Tamir et al. | |
| 2009/0106567 | A1 * | 4/2009 | Baarman | 713/300 |
| 2010/0057969 | A1 * | 3/2010 | Meiri et al. | 710/303 |
| 2010/0295960 | A1 * | 11/2010 | Furlan et al. | 348/222.1 |
| 2011/0127954 | A1 * | 6/2011 | Walley et al. | 320/108 |

* cited by examiner

*Primary Examiner* — Thomas Lee
*Assistant Examiner* — Aurel Prifti
(74) *Attorney, Agent, or Firm* — Terrile, Cannatti, Chambers & Holland, LLP; Robert W. Holland

(57) ABSTRACT

A wireless power module couples to an information handling system to accept power from a wireless power source and to provide the power to the information handling system through a docking station connector of the information handling system. The wireless power module selectively decouples from the information handling so that an end user can elect to reduce the footprint of the information handling system by removing the wireless power module when not taking advantage of wireless power.

18 Claims, 4 Drawing Sheets

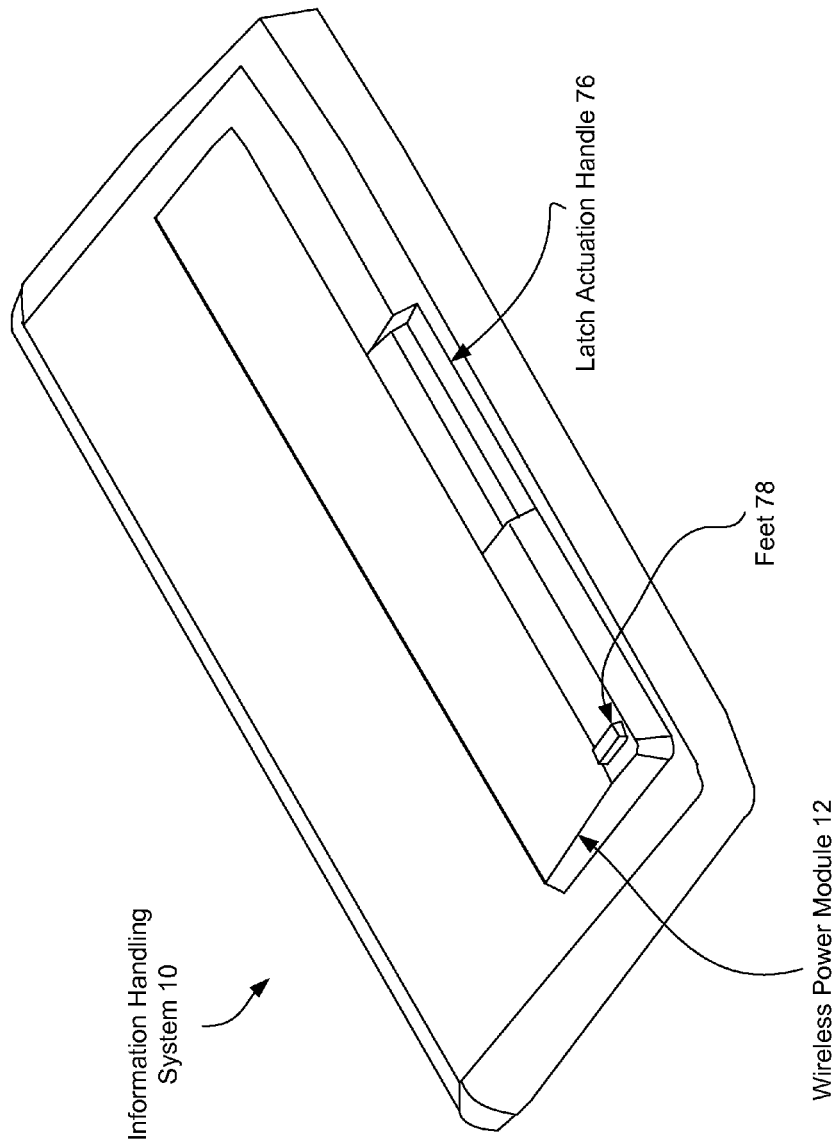

INFORMATION HANDLING SYSTEM WIRELESS POWER DOCKING STATION MODULE WITH SHARED POWER SOURCE AND WIRELESS PERIPHERAL SUPPORT

BACKGROUND OF THE INVENTION

1. Field of the Invention

The present invention relates in general to the field of information handling power supply devices, and more particularly to an information handling system wireless power docking station module.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Improved processing capabilities for information handling system components have resulted in the design and manufacture of highly-capable systems built in relatively small housings. These greater processing capabilities have made portable information handling systems increasingly attractive to enterprise and individual end users. Portable information handling systems typically include an integrated power source, integrated I/O devices and integrated wireless networking so that the system is fully functional without any hardwire connections to fixed resources. One example of a portable information handling system is a clamshell housing having a chassis portion to contain processing components and a keyboard and having a lid portion rotationally-coupled to the chassis portion to selectively expose and protect a liquid crystal display (LCD). Another example of a portable information handling system is a tablet housing that uses a touchpad on the display to accept end user inputs. Both clamshell and tablet housing configurations generally include an integrated battery power supply having a rechargeable battery that supports operation of processing components independent from a fixed power outlet, such as an AC power socket. Typically, an external AC-to-DC adapter provides DC power to a connector at the housing to recharge the battery.

Many end users have replaced their desktop information handling systems, which operate from a fixed location, with portable information handling systems. A docking station is a convenient tool for operation of a portable information handling system in a fixed location. Docking stations interconnect with a variety of peripheral devices through standard cables so that an end user can essentially set up a desktop location for use with a portable information handling system. The portable information handling system connects at a docking connector that coordinates communication with peripheral devices and application of external power. As an example, an end user places a portable information handling system having a clamshell configuration in a closed position into a docking station to mate opposing docking station connectors. The processing components execute applications based upon inputs made at a keyboard of the docking station and present information as visual images at a display of the docking station. If the end user needs to leave the desktop area, the end user removes the portable information handling system from the docking station and uses integrated I/O devices and power to continue processing operations.

One difficulty with integrated rechargeable power sources is that the charge life of batteries that fit into portable information handling systems tends to be limited. Connecting a power adapter to a portable information handling system tends to make the housing more difficult to handle. Portable telephones are sometimes equipped to re-charge wirelessly to reduce the inconvenience of physically connecting an adapter to the telephone housing. A typical wireless charging system inductively couples a power source and sink across a gap by using a wire coil and alternating electromagnetic fields. The power source is often disposed in a mat on which the portable telephone is laid down. However, adding a coil, power interface, charging controller and other physical and logical support for wireless power tends to increase the size of the telephone. End users generally prefer to keep portable information handling systems as small as possible, which makes implementation of wireless power for commercial use more difficult to achieve.

SUMMARY OF THE INVENTION

Therefore a need has arisen for a system and method which provides wireless power to portable information handling systems.

In accordance with the present invention, a system and method are provided which substantially reduce the disadvantages and problems associated with previous methods and systems for powering a portable information handling system. A wireless power coil electrically and removably couples with an information handling system docking station connector to selectively enable transmission of power to the information handling system from a wireless power source.

More specifically, an information handling system processes information with processing components disposed in a portable housing. The processing components are selectively powered by an internal power source that includes a rechargeable battery. An external AC-to-DC adapter converts external AC power to DC power and provides the DC power to a connector at the information handling system housing to power the processing components and recharge the battery. A wireless power module selectively couples and decouples to the information handling system to provide wireless power transmission capability. The wireless power module interfaces with the internal power source through a docking station connector that otherwise provides docking station functionality to the information handling system. The information handling system rests on top of a wireless power source that is proximate the wireless power module to provide wireless power transmission. In alternative embodiments, additional functionality may be included in the wireless power module, such as cooling, wireless network support of peripheral devices in a wireless docking station configuration and additional battery storage. The same AC-to-DC adapter that powers the information handling system may be connected to the wireless power source to provide power for wireless power transmission.

The present invention provides a number of important technical advantages. One example of an important technical advantage is that a portable information handling system receives power wirelessly without increasing the size of the housing that contains processing components of the portable information handling system. Physical and logical resources for supporting wireless power are included in a docking module that selectively engages and disengages with a docking connector of the portable information handling system to avoid permanent increases to the size of the housing. When coupled to the housing, the wireless power module receives power from a wireless power source for use by the information handling system. When removed from the housing, the wireless power module and related infrastructure add little if any additional size to the system since the wireless power module leverages a docking station connector present in the housing to provide docking station compatibility. In alternative embodiments, the wireless power module provides an ergonomic typing surface and additional functionality that improves the end user experience, such as cooling or communications functionality.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 depicts a wireless power module coupled to the bottom surface of a portable information handling system.

DETAILED DESCRIPTION

A removably coupled wireless power module accepts wireless power for an information handling system through existing docking station functionality. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
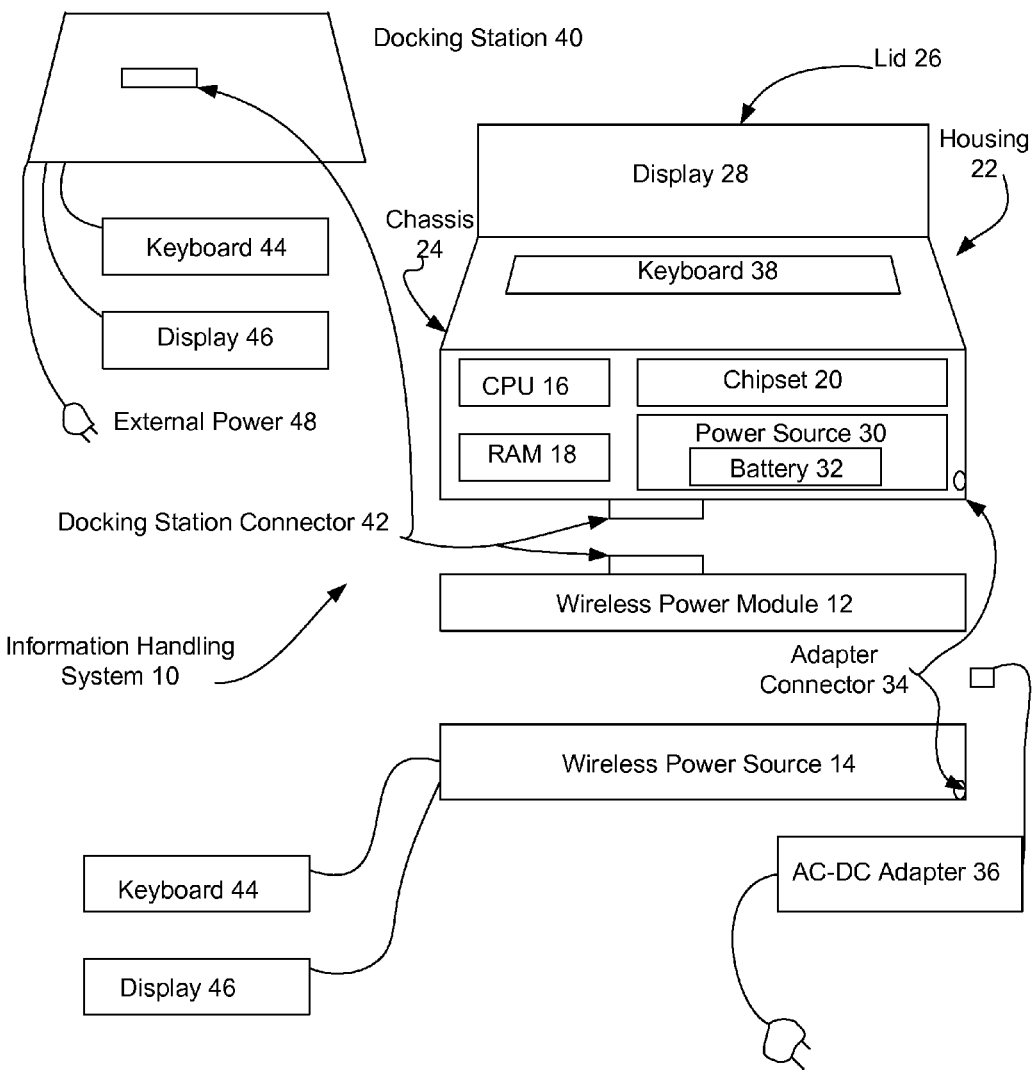
FIG. 1 depicts an information handling system having a selectively removable wireless power module that receives power from a wireless power source.

Referring now to FIG. 1, an information handling system 10 is depicted having a selectively removable wireless power module 12 that receives power from a wireless power source 14. Information handling system 10 is built from plural processing components, such as a CPU 16, RAM 18 and chipset 20, disposed in a portable housing 22. In the example embodiment depicted by FIG. 1, portable housing 22 includes a chassis portion 24 that contains the processing components and a rotationally-coupled lid portion 26 that contains a display 28 interfaced with the processing components to present information as visual images. An integrated power source 30 provides power to operate the processing components, such as with a rechargeable battery 32. Power source 30 manages selects the power source that powers the processing components, such as the battery, and external adapter or a wireless power source. An adapter connector 34 removably connects with an external power source, such as an AC-to-DC adapter 36, which provides power to the processing components and also recharges battery 32.

During portable operations, an end user inputs information at an integrated keyboard 38, views information with integrated display 28 and powers the processing components with battery 32 so that portable information handling system 10 operates free from wired connections. In one example of a non-portable mode of operation, portable information handling system 10 couples to a docking station 40 through a docking station connector 42. Docking station 40 essentially turns portable information handling system 10 into a desktop system by offering external peripheral devices, such as a keyboard 44 and display 46, and external power 48. Opposing docking station connectors 42 on docking station 40 and information handling system 10 provide a single connection point for transferring power and peripheral information between docking station 40 and the processing components within information handling system 10. To operate in a docked condition, an end user places information handling system 10 in docking station 40 to couple docking station connectors 42 together. In the docked condition, the end user has the convenience of peripheral devices that are larger and easier to use than those integrated in information handling system 10. To operate in a portable condition, an end user removes the coupling of docking station connectors 42 and uses integrated I/O devices for interacting with the processing components.

To provide improved flexibility in operating information handling system 10, a wireless power module 12 is provided with a docking station connector 42 to couple to the docking station connector 42 of portable information handling system 10. Wireless power module 12 wirelessly receives power from a wireless power source 14, such as by direct induction or resonant magnetic induction, and provides the power to power source 30 for running the processing components and/or recharging battery 32. Wireless power module 12 removably couples to information handling system 10 so that an end user can remove wireless power module 12 if the end user desires to reduce the size and weight of information handling system 10. However, wireless power module 12 does not interfere with operation of portable information handling system 10 in the portable operation mode, thus allowing an end user to readily pick up and use portable information handling system 10 when desired and to replace portable information handling system 10 onto wireless power source 14 when done using the system so that battery charging can continue. In transitioning between external power support provided wirelessly and internal power support, the end user simply lifts information handling system 10 distal from wireless power source 14 without connecting or disconnecting any wires, connectors or cables. Wireless power source 14 receives power through an adapter connector 34 that uses the same AC-to-DC adapter 36 as connects to the housing of information handling system 10. In one embodiment, wireless power source 14 provides a wireless docking module with a wireless networking interface established between wireless power source 14 and wireless power module 12. Peripheral information from a keyboard 44 and display 46 connected to wireless power source 44 is communicated with processing components of information handling system 10 through wireless networking docking station connector 42. In one embodiment, the wireless network interface may communicate directly with external devices, such as wireless display, using standard personal area network communications.

Figure 2:
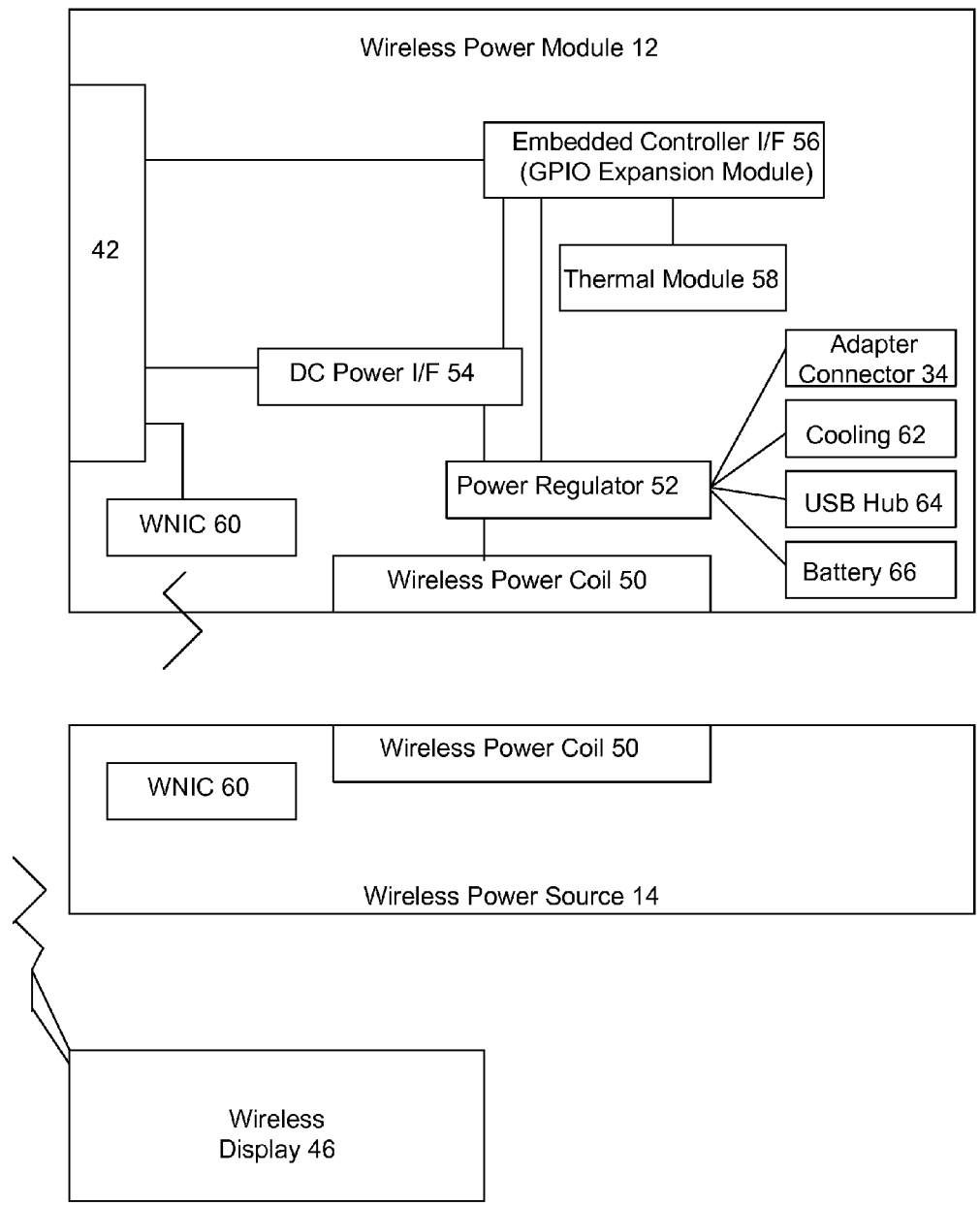
FIG. 2 depicts a block diagram of a wireless power module that selectively couples to an information handling system docking connector.

Referring now to FIG. 2, a block diagram depicts a wireless power module 12 that selectively couples to an information handling system docking connector 42. A wireless power coil 50 accepts wireless power from wireless power source 14 and provides the power under the control of a power regulator 52 through a power interface 54 power line of docking station connector 42. In one embodiment, the power line of docking station connector 54 is to the same power pin that supports power transfer from a conventional docking station. Power regulator 52 manages the amount of power received from wireless power source 14 based in part upon the need for power by information handling system 10 as communicated through an embedded controller interface 56 that interfaces with processing components of information handling system 10 through docking connector 42. For example, embedded controller interface 56 exchanges identifier information so that information handling system 10 knows what is attached, such as with an adapter ID or GPIO extension. A power good signal may be exchanged to engage wireless power as may a near field detection. A thermal module 58 manages thermal conditions within wireless power module 12 to prevent overheating.

In alternative embodiments, a variety of functions may be supported by wireless power module 12 to support different operation of information handling system 10. In one alternative embodiment, a wireless network interface card (WNIC) 60 disposed in wireless power module 12 and wireless power source 14 supports communication of information, such as to provide a wireless docking station configuration. Peripherals connected to wireless power source 14 access processing components of information handling system 10 through WNICs 60 and then pins used at docking station connector 42 to support peripheral communication of a conventional docking station connector. In one alternative embodiment, WNIC 60 of wireless power module 12 communicates directly with peripheral devices using wireless capabilities of the peripheral devices, such as a wireless keyboard, mouse or a wireless display 46. Direct wireless communication by wireless power module 12 to display 46 allows an end user to selectively enable wireless display capabilities by connecting wireless power module 12 or to reduce the size of information handling system 10 by removing wireless power module 12. In another alternative embodiment, supplemental cooling is provided for information handling system 10 with a cooling fan 62 or with additional venting. Another alternative function is the availability of additional communication ports, such as by including a USB hub 64 with wireless power module 12.

A number of options are available to provide power for the operation of components within wireless power module 12. If power is provided from wireless power coil 50, power regulator 52 can direct some of that external power to the components within wireless power module 12. Alternatively, power may be provided from information handling system 10 through connector 42 so that WNIC 60 and other components can operate using system power. An additional battery 66 may also be included in wireless power module 12 to provide additional power for information handling system 10 when operating to distal from wireless power source to accept external power, and to power internal components of wireless power module 12. Battery 66 also accepts a charge from wireless power source 14 when wireless power module 12 is not connected to information handling system 10. In addition, an adapter connector 34 may interface with an external power adapter to accept external power for operating internal components of wireless power module 12. Various protection circuits may be used to interface adapter connector 34, cooling fan 62, USB hub 64 and battery 66 with power regulator 52 so that protection is provided against power faults that might occur.

Figure 3:
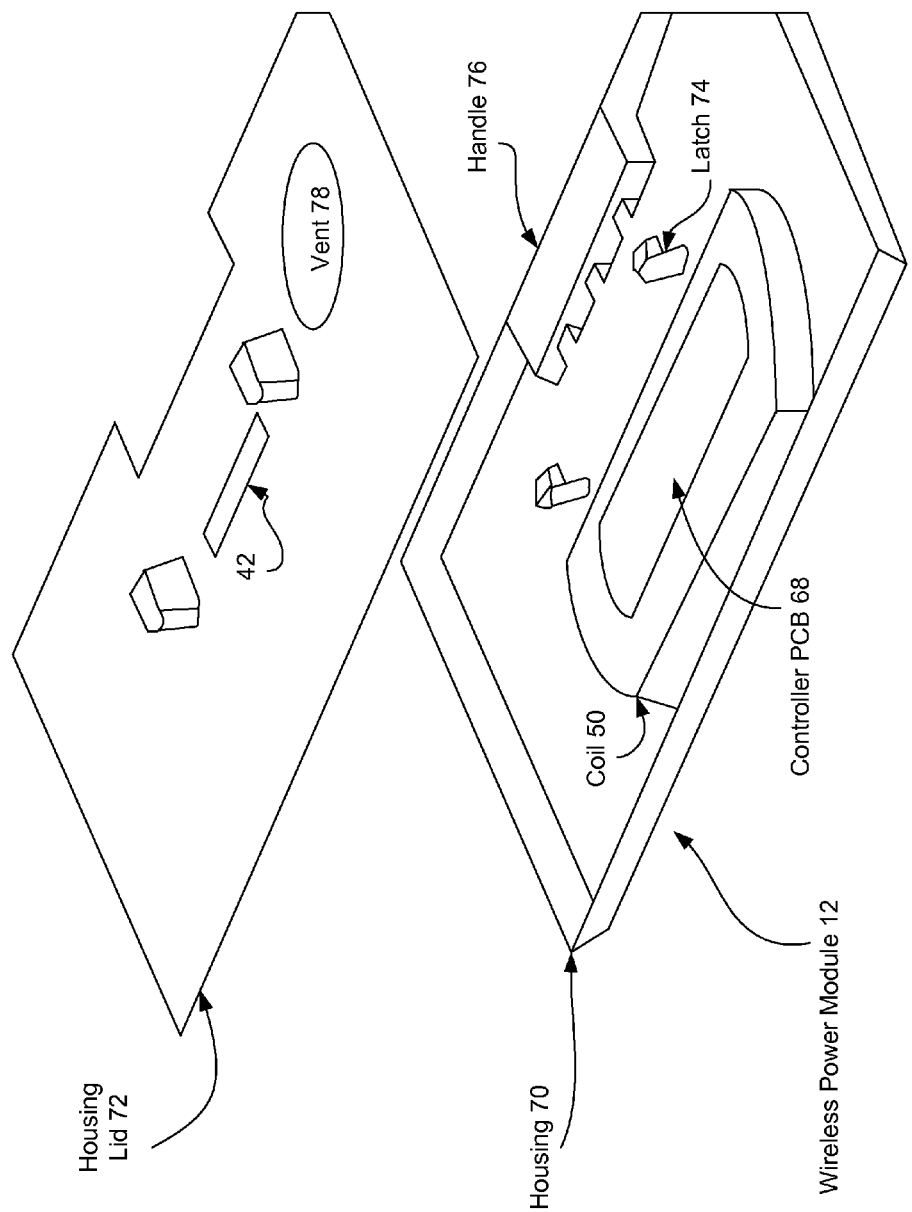
FIG. 3 depicts an example embodiment of a wireless power module adapted to removably couple to the bottom surface of an information handling system.

Referring now to FIG. 3, an example embodiment depicts a wireless power module 12 adapted to removably couple to the bottom surface of an information handling system. A housing 70 and housing lid 72 enclose coil 50 and control elements disposed on a printed circuit 68 to manage communication of power and information through docking station connector 42. A latch 74 and latch handle 76 actuate to selectively engage housing 70 to the bottom surface of an information handling system at the outer surface of housing lid 72. A vent 78 optionally aligns with the vent of an information handling system to providing cooling airflow through gaps formed within wireless power module 12 so that wireless power module 12 cools to reduce the thermal impact of the information handling system bottom surface.

Referring now to FIG. 4, a wireless power module 12 is depicted coupled to the bottom surface of a portable information handling system 10. If an end user desires to remove wireless power module 12, actuating handle 76 releases the latch 74 to allow separation from information handling system 10. Rubber feet 78 help to maintain the position of information handling system when resting on a surface. Positioning wireless power module 12 at the rear of information handling system 10 raises the rear so that typing is performed with a more ergonomic angle.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
plural processing components disposed in the housing and operable to cooperate to process information;
a display integrated in the housing and interfaced with the processing components, the display operable to present the information as visual images;
a power source integrated in the housing and operable to power the processing components;
a docking station connector disposed at the housing and operable to interface the processing components with a docking station external to the housing, the docking station supporting communication between the processing components and external peripheral devices interfaced with the docking station; and a wireless power module removably coupled to the docking station connector and operable to accept power wirelessly from a wireless power source and provide the power to the power source;

wherein the wireless power module and wireless power source each include a wireless network interface card operable to communicate information between each other, the wireless network interface cards operable to communicate information between peripheral devices and the processing components through the docking station connector.

2. The information handling system of claim 1 further comprising a wireless power source disposed proximate to the wireless power module and operable to provide power to the wireless power module.

3. The information handling system of claim 2 further comprising an AC-to-DC adapter operable to convert AC power to DC power and to supply the DC power to a power connector disposed at the housing, the connector interfaced with the power source, the AC-to-DC adapter further operable to supply DC power to a power connector disposed at the wireless power module.

4. The information handling system of claim 2 wherein the housing has a bottom surface and the wireless power module couples to the bottom surface and rests on top of the wireless power source.

5. The information handling system of claim 2 wherein the wireless power module and wireless power source transmit power with direct induction.

6. The information handling system of claim 2 wherein the wireless power module and wireless power source transmit power with resonant magnetic induction.

7. The information handling system of claim 1 further comprising plural peripheral devices connected to the wireless power source, the wireless network interface cards operable to communicate information between the peripheral devices and the processing components through the docking station connector.

8. The information handling system of claim 1 further comprising a cooling device disposed in the wireless power module and operable to supplement cooling of the information handling system.

9. The information handling system of claim 1 further comprising a release handle disposed at the wireless power module outer surface and operable to release the wireless power module from the housing.

10. A method for providing power to an information handling system comprising:
connecting a wireless power module to a docking station connector at the housing of the information handling system, the docking station connector operable to communicate information between the information handling system and peripherals interfaced with the docking station;
placing the information handling system to locate the wireless power module proximate a wireless power source;
wirelessly transmitting power from the wireless power source to the wireless power module;
providing the power from the wireless power module to the information handling system through the docking station connector;
connecting an AC-to-DC power adapter to a connector of the wireless power source to provide power to the wireless power source;
disconnecting the AC-to-DC power adapter from the wireless power source; and
connecting the AC-to-DC power adapter to a connector of the information handling system to provide power to the information handling system.

11. The method of claim 10 further comprising:
disconnecting the wireless power module from the docking station connector; and
powering the information handling system with power provided from the wireless power source and stored in a battery integrated in the information handling system.

12. The method of claim 10 further comprising:
disposing wireless networking resources in the wireless power module and the wireless power source; and
communicating display information from the information handling system through the docking station connector and wireless networking resources to a display coupled to the wireless power source and electrically interfaced with the wireless networking resources.

13. The method of claim 10 further comprising:
inputting key information at keys of a keyboard;
communicating the key information to the wireless power source;
wirelessly communicating the key information from wireless networking resources of the wireless power source to wireless networking resources of the wireless power module;
communicating the key information from the wireless power module through the docking station connector to processing components of the information handling system.

14. The method of claim 10 wherein wirelessly transmitting power further comprises transmitting power with direct induction.

15. The method of claim 10 further comprising venting cooling airflow between the information handling system housing interior and exterior through vent openings of the housing and wireless power module.

16. A wireless power module comprising:
a wireless power coil operable to wirelessly accept power from a wireless power source;
a docking station connector interfaced with the wireless power coil and operable to provide power from the wireless power coil to an information handling system docking station connector; and
a power adapter configured to selectively provide power to the wireless power coil or to provide power directly to the information handling system.

17. The wireless power module of claim 16 further comprising a housing having an actuator to selectively couple and decouple with an information handling system, the housing containing the wireless power coil and docking station connector.

18. The wireless power module of claim 17 wherein the docking station connector aligns with a bottom surface of the information handling system and the housing rests on a surface to support the information handling system at a predetermined angle.

* * * * *